United States Patent [19]

Fenske et al.

[11] Patent Number: 5,716,175
[45] Date of Patent: Feb. 10, 1998

[54] SNOWMOBILE SKI HOLD DOWN ASSEMBLY FOR TRAILER AND METHOD

[75] Inventors: Donald J. Fenske; Eric P. Clement, both of Cresco, Iowa; Gary H. Ihrke, Rochester, Minn.

[73] Assignee: Featherlite Mfg., Inc., Cresco, Iowa

[21] Appl. No.: 616,803

[22] Filed: Mar. 15, 1996

[51] Int. Cl.$^6$ .................................................. B60P 7/00
[52] U.S. Cl. ................................................ 410/3; 410/30
[58] Field of Search ........................... 410/2, 3, 4, 9, 410/10, 11, 19, 30; 414/233, 234, 286

[56] References Cited

U.S. PATENT DOCUMENTS

| | | | |
|---|---|---|---|
| 3,726,423 | 4/1973 | Miron | 296/61 |
| 3,955,847 | 5/1976 | Schiowitz | 296/65 R |
| 4,671,713 | 6/1987 | Lenkman | 410/7 |
| 5,044,845 | 9/1991 | Baker, Jr. | 410/3 |
| 5,203,655 | 4/1993 | Persau | 410/3 |
| 5,387,070 | 2/1995 | Roeling | 410/3 |
| 5,553,882 | 9/1996 | Unruh | 410/3 |

OTHER PUBLICATIONS

Photographs of a Featherlite Mfg. Co., Inc. ski hold down system, 3 pages.

Floe International brochure entitled "Revolutionary High Tech Aluminum Trailers," 4 pages, copyright 1994.

Triton Corporation brochure entitled "Aluminum Snowmobile Trailers . . . A Leader in the Following," 4 pages, copyright 1994.

Triton Corporation brochure entitled "Triton For The '90's," 4 pages, undated.

Primary Examiner—Karen B. Merritt
Assistant Examiner—Gregory A. Morse
Attorney, Agent, or Firm—Merchant, Gould, Smith, Edell, Welter & Schmidt, P.A.

[57] ABSTRACT

A ski bar hold down assembly including a post is rotatably and slideably mounted to a ski bar for use in mounting the ski bar to a trailer. The assembly includes a stop on a lower end of the post engaged with a lower surface of the trailer. The assembly further includes a releasable clamp mounted to an upper end of the post and engaged with a top of the ski bar. The clamp selectively mounts the ski bar to the trailer so as to mount snowmobile skis of a snowmobile between the ski bar and the trailer. If desired, the hold down assembly can also be mounted to the trailer even if no snowmobile is present. A method of mounting the ski bar is provided including the steps of inserting a post of a hold down assembly into a passage in the platform of the trailer, rotating the post 90°, then moving a clamp on the assembly to clamp the ski bar to the trailer.

27 Claims, 3 Drawing Sheets

SNOWMOBILE SKI HOLD DOWN ASSEMBLY FOR TRAILER AND METHOD

FIELD OF THE INVENTION

The present invention relates to assemblies and methods for securing snowmobiles to trailers.

BACKGROUND OF THE INVENTION

When transporting a snowmobile on a trailer from one location to another, there is a need to secure the snowmobile to the trailer. One known system for securing the snowmobile to the trailer is through the use of a ski bar which is positioned transversely across the tops of the skis of the snowmobile. In the known system, the ski bar is held to the trailer by a threaded rod having a handle at an upper end. A lower end of the rod passes through the ski bar and is threadably mounted to a threaded passage in the trailer platform. This system is awkward to use since the operator must insert the rod through the ski bar, and then locate the threaded passage in the trailer platform with the end of the rod. Problems can arise if the threaded passage of the trailer is filled with debris, has its threads stripped, or becomes cross-threaded. Also, the threaded rod protrudes below the trailer, and is subject to damage from being bumped, or from the elements.

There is a need for hold down assemblies and methods which operate more reliably and easily to securely mount snowmobiles to trailers.

SUMMARY OF THE INVENTION

One aspect of the present invention relates to a hold down assembly for use on a snowmobile trailer including a post, a stop positioned at a lower end of the post, and a releasable clamp positioned at an upper end of the post. The clamp selectively mounts a ski bar to the snowmobile trailer. The post is received in a hole through the ski bar and the ski bar is positioned between the stop and the lower surface of the lower block. The ski bar and the stop are further spaced apart sufficient to receive a portion of the trailer. When a snowmobile is present, the ski bar clamps the skis of the snowmobile to the trailer.

The clamp preferably includes an upper block mounted to the upper end of the post, and a lower block slideably mounted to the post between the upper block and the stop. The upper block includes a threaded passage. A threaded adjustment rod is received by the threaded passage of the upper block. An upper end of the adjustment rod includes a handle for rotation of the rod. A lower end of the adjustment rod is rotatably mounted to the lower block wherein rotation of the rod by the handle moves the lower block along the post. The adjustment rod is rotatable to move the lower block toward and away from the ski bar to selectively clamp the ski bar to the trailer.

Preferably, structure is provided for preventing rotation of the post relative to the ski bar during clamping. In one embodiment, an upwardly facing U-shaped bracket is mounted to the top of the ski bar for engagement with the lower block. Alternatively, another embodiment includes the lower surface of the lower block having an inverted channel shape sized for engagement with the ski bar.

The hold down assembly preferably mounts to the trailer wherein the post is positioned in a passage, such as a slot, through the trailer such that the stop engages a lower surface of the trailer. In one embodiment, the stop includes a pin positioned in a hole through the post. Preferably, plural holes are provided in the post for selective use of one or more pins, so as to accommodate trailer uses where no snowmobile is carried, and uses where snowmobiles having different thicknesses of skis are carried. In the preferred embodiment, the pin(s) extend from the post in two directions.

A further aspect of the present invention relates to a snowmobile trailer including a trailer body with an upper surface and a lower surface with a passageway therebetween. A ski bar is positioned above the upper surface of the trailer body. A clamp assembly is mounted to the ski bar. The clamp assembly further includes a stop which is engaged with the lower surface of the trailer body, and a releasable clamp which is engaged with the top of the ski bar. The ski bar clamps the skis of the snowmobile to the trailer for transport.

Another aspect of the present invention relates to a method of mounting a ski bar to a snowmobile trailer including the steps of inserting a post of a hold down assembly into a slot of the trailer, rotating the post of the hold down assembly 90° about a longitudinal axis of the post wherein a stop on the post is engageable with the trailer, and moving a clamp of the hold down assembly relative to the post to clamp the ski bar to the trailer. The ski bar clamps the skis of the snowmobile to the trailer when the snowmobile is transported.

DETAILED DESCRIPTION OF THE PREFERRED EMBODIMENTS

In the present invention, a hold down assembly is provided for selectively mounting a snowmobile to a trailer. The assembly mounts to the trailer and clamps the skis of the snowmobile to the trailer utilizing a releasable clamp which engages the top of a ski bar positioned transversely across the skis. Preferably, the hold down assembly can accommodate snowmobiles having skis of different thicknesses. The preferred use of the hold down assembly is to secure a snowmobile to the trailer during transport. Preferably, the hold down assembly can also be secured to the trailer even if no snowmobile is present. One hold down assembly is preferred for each snowmobile to be carried by the trailer.

Figure 1:
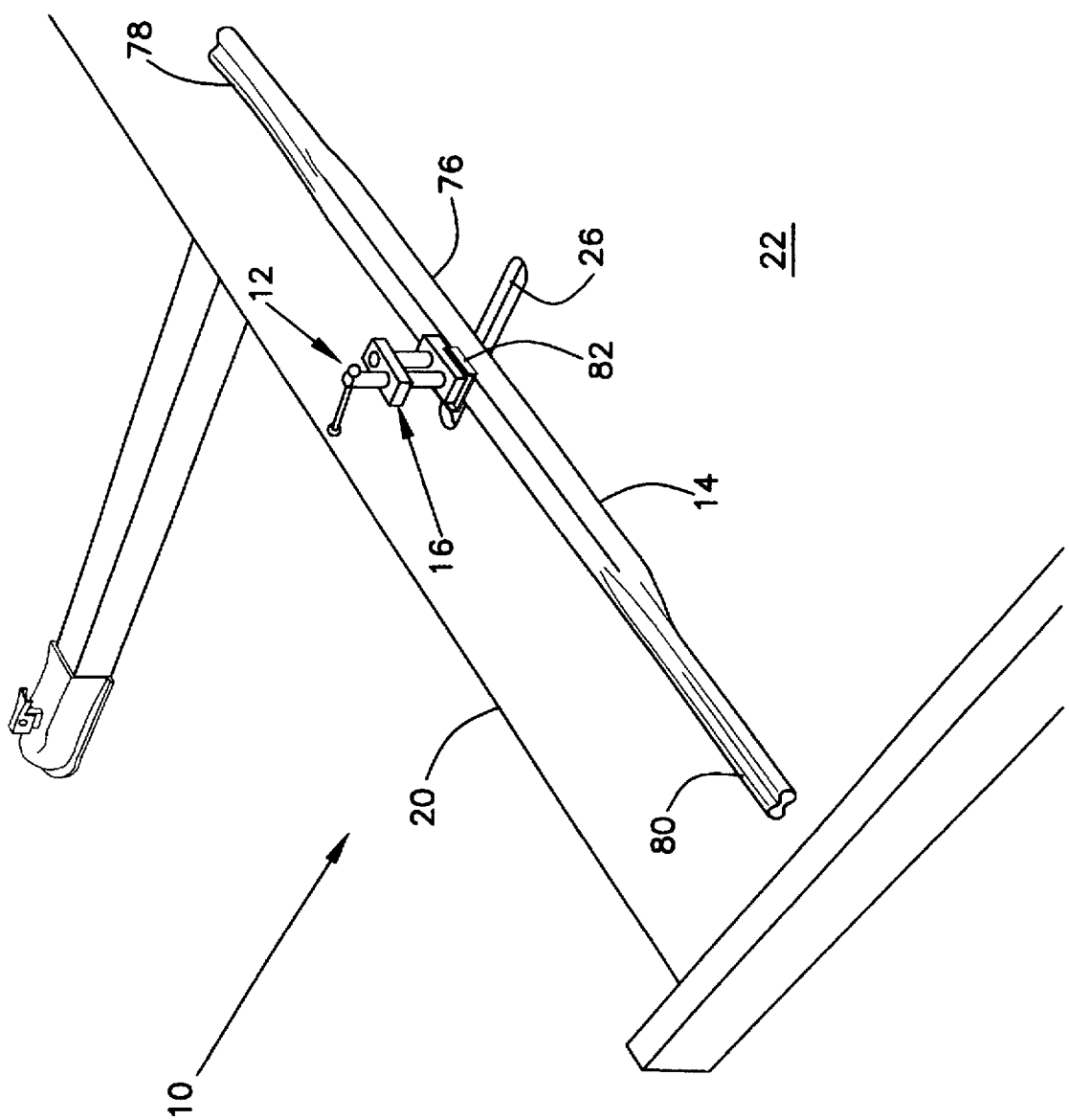
FIG. 1 is a perspective view of a first embodiment of a trailer including a snowmobile ski hold down assembly.
Figure 2:
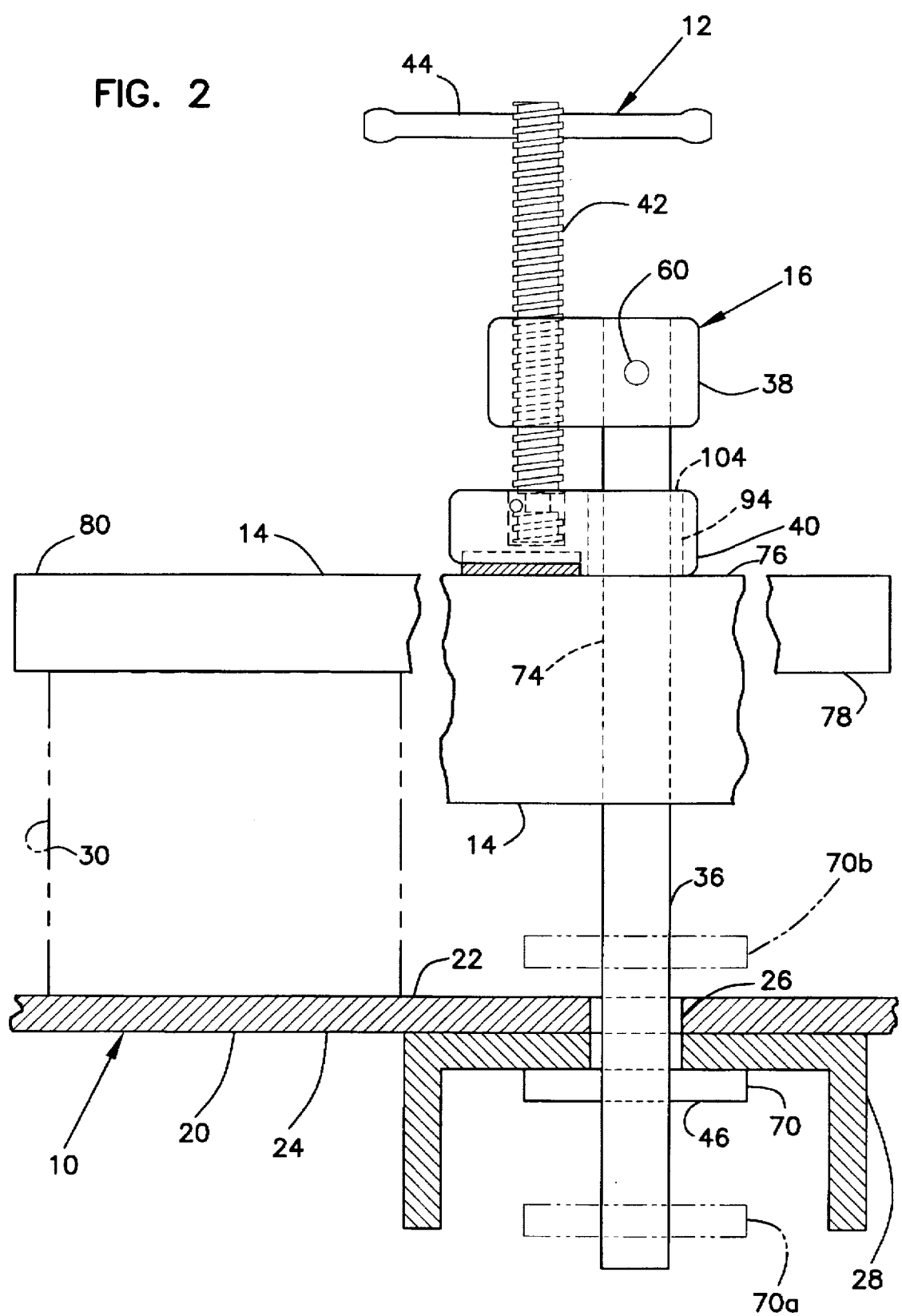
FIG. 2 is a partial cross-sectional side view of the trailer of FIG. 1 showing the snowmobile ski hold down assembly mounting a snowmobile to the trailer platform.

Referring now to FIGS. 1 and 2, a first embodiment of a trailer 10 is shown including a hold down assembly 12 which includes a ski hold down bar 14 and a clamp assembly 16 for holding bar 14 to trailer 10. In FIG. 1, trailer 10 is shown with hold down assembly 12 not securing any snowmobile to the trailer. Also in FIG. 1, only one hold down assembly 12 is shown. Further assemblies 12 are provided for each snowmobile on trailer 10. FIG. 2 shows hold down assembly 12 securing a snowmobile with skis 30 to the trailer (only one ski 30 is shown). Bar 14 is positioned transversely across the fronts of skis 30, with each end of bar 14 positioned over one ski 30.

Trailer 10 includes a platform 20 having an upper planar surface 22 supporting the snowmobile and an opposite facing lower planar surface 24. Passage 26 is provided through platform 20. Passage 26 has an elongated slotted shape in the preferred embodiment running transverse to ski bar 14. Other shapes for passage 26 are possible. Trailer 10 also includes a lower frame member 28 supporting lower planar surface 24 of platform 20.

Clamp assembly 16 preferably includes a post 36 extending generally vertically through passage 26 during use. Upper and lower blocks 38, 40 are mounted to post 36 above bar 14. A rotatable threaded adjustment rod 42 moves lower block 40 along post 36 toward and away from bar 14 during use. Handle 44 on rod 42 provides a convenient mechanism for rotating rod 42 by hand. Stop 46 extends from post 36 and is positioned adjacent to a lower portion of frame member 28 of trailer 10 during use. Post 36 is slideably mounted to bar 14. During use, stop 46 can be moved toward and away from frame member 28 by rotation of rod 42 to effect clamping and unclamping of bar 14.

Figure 3:
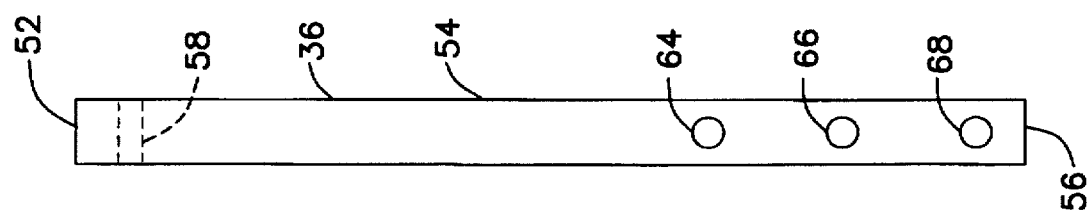
FIG. 3 is a side view of the post of the assembly of FIGS. 1 and 2.

Referring now to FIGS. 2 and 3, post 36 includes an upper end 52, an intermediate portion 54, and a lower end 56. Upper end 52 includes a roll pin hole 58 for receipt of a roll pin 60 to mount upper block 38 to upper end 52 of post 36. Lower roll pin holes 64, 66, 68 are each sized for selective receipt of a roll pin 70 which functions as stop 46. Roll pin 70 is positioned in the middle hole 66 in the embodiment shown. Preferably, roll pin 70 extends from both sides of post 36.

Holes 64 and 68 are optional, but are preferred. Roll pin 70 can be positioned in lowermost hole 68, if desired, for use with snowmobiles having thicker skis (see roll pin 70a in FIG. 2). Roll pin 70 can be positioned in the uppermost hole 64, if desired, such as in the case of mounting hold down assembly 12 to trailer 10 when no snowmobile is present (see roll pin 70b in FIG. 2). Alternatively, a second roll pin like roll pin 70 can be positioned in uppermost hole 64. If two roll pins are present at lower end 56 of post 36, then the upper roll pin (i.e., roll pin 70b), would engage frame member 28 during clamping of bar 14 to trailer 10 without a snowmobile present. The lower roll pin (i.e., roll pin 70), would be engaged with frame member 28 when a snowmobile was present, as shown in FIG. 2. In that case, the upper roll pin 70b would be positioned adjacent top surface 22 of trailer 10 during use of trailer 10 with a snowmobile present. It is to be appreciated that an upper pin provided in uppermost hole 64 could be provided during manufacture and initial transport of trailer 10. Then, that roll pin could be removed from hole 64 leaving only roll pin 70 positioned in hole 66 or hole 68 as desired. Also, roll pin 70 could be selectively moved from hole 64 to holes 66, 68, as desired. Alternatively, a longer adjustment rod 42 can be provided so as to accommodate both a no ski hold down position, and a ski hold down position of hold down assembly 12.

Intermediate portion 54 of post 36 is rotatably and slideably positioned in a hole 74 through a center region 76 of bar 14. Free ends 78, 80 of bar 14 are sized for positioning over skis 30, one end 78, 80 over each ski 30 of the snowmobile. A bracket 82 mounted at center region 76 of bar 14 has a U-shape with the trough portion facing upwardly during use. Bracket 82 provides structure for preventing rotation of post 36 during use. Bracket 82 receives a portion of lower block 40 when clamped.

Figure 4:
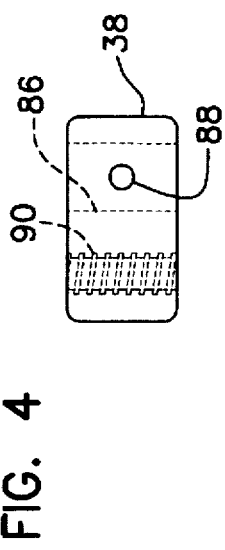
FIG. 4 is a side view of the upper block of the assembly of FIGS. 1 and 2.
Figure 5:
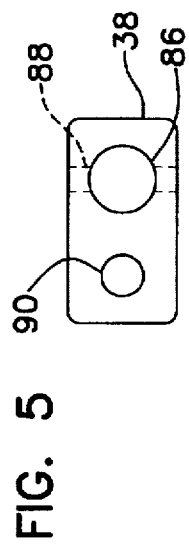
FIG. 5 is a top view of the upper block of FIG. 4.

Referring now to FIGS. 2, 4 and 5, upper block 38 includes a post hole 86 for receiving upper end 52 of post 36. A roll pin hole 88 receives roll pin 60 to mount upper block 38 to post 36. Upper block 38 also includes a threaded bore 90 having an axis parallel to the axis defined by post hole 86. A threaded bore 90 rotatably receives adjustment rod 42 for relative longitudinal movement.

Figure 6:
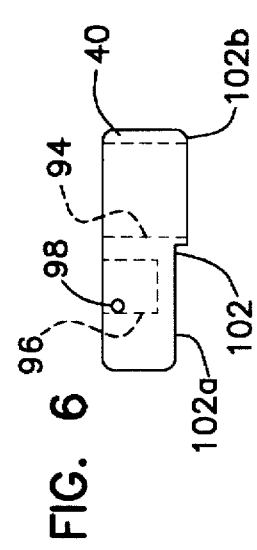
FIG. 6 is a side view of the lower block of the assembly of FIGS. 1 and 2.
Figure 7:
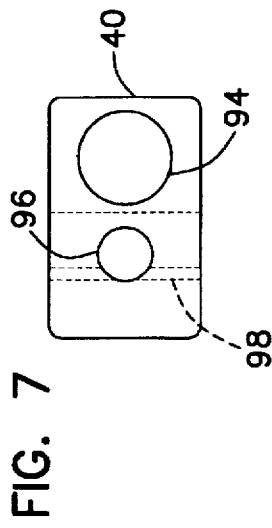
FIG. 7 is a top view of the lower block of FIG. 6.
Figure 9:
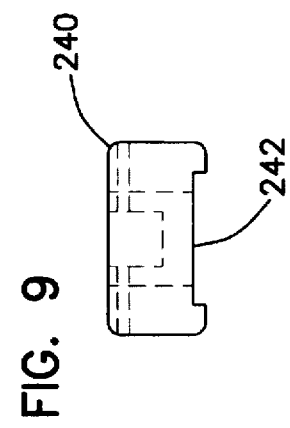
FIG. 9 is an end view of an alternative embodiment of a lower block to the lower block shown in FIGS. 6 and 7.

Referring now to FIGS. 2, 6 and 7, lower block 40 includes a post hole 94 for slidable and rotatable receipt of post 36. Post hole 94 may be sized sufficiently large to receive an optional inner plastic bushing 104, if desired. Lower block 40 further includes a recess 96 for receipt of adjustment rod 42. A roll pin hole 98 receives a roll pin 100 to mount adjustment rod 42 to lower block 40. A lower surface 102 of lower block 40 engages bar 14 during clamping. In particular, a stepped lower surface portion 102a is received in bracket 82 of bar 14 to prevent relative rotation of post 36 and bar 14. A second lower surface portion 102b is adjacent to a top of bar 14 around hole 74 of bar Referring now to FIG. 9, an alternative embodiment of a lower block 240 is shown. Lower block 240 is modified relative to lower block 40 in that a lower surface 242 has an inverted channel shape so as to receive a top surface of bar 14 thereby preventing relative rotation during clamping. This construction eliminates the need for the extra bracket mounted to bar 14.

Figure 8:
FIG. 8 is a side view of the threaded adjustment rod of the assembly of FIGS. 1 and 2.

Referring now to FIGS. 2 and 8, adjustment rod 42 includes an upper end 106, a lower end 108, and an intermediate portion 110. Intermediate portion 110 includes threads 112 which threadably engage threaded bore 90 in upper block 38. Upper end 106 of adjustment rod 42 includes a hole 114 for receipt of handle 44. Handle 44 is preferably slideably mounted within hole 114 so as to provide a versatile positioning of handle 44.

Lower end 108 of adjustment rod 42 includes a reduced diameter portion 116 which is engaged by roll pin 100 in the preferred embodiment to mount lower end 108 of adjustment rod 42 to lower block 40. Roll pin 100 traps lower end 108 of rod 42 in recess 96 of lower block 40. Other lock members instead of roll pin 100 can be used to hold lower end 108 of adjustment rod 42 to lower block 40. During use, lower end 108 of adjustment rod 42 rotates in recess 96 and intermediate portion 110 moves longitudinally relative to upper block 38 as handle 44 is rotated. In this manner, the distance between stop 46 and lower block 40 can be varied as desired by the operator to clamp or unclamp bar 14 to trailer 10. Since post 36 is slideable relative to bar 14, post 36 is moveable up and down via operation of clamp assembly 16 to move stop 46 into and out of a clamping position.

One preferred method of using hold down assembly 12 is to insert lower end 56 of post 36 into passage 26 until stop 46 clears frame member 28. Then post 36 is rotated 90° about its longitudinal axis or otherwise moved to position stop 46 adjacent to a lower surface of frame member 28. Handle 44 is then rotated to bring lower block 40 closer to stop 46 so as to clamp bar 14 to trailer 10. Lower block 40 moves along post 36 until both lower surface portion 102a is received by bracket 82, and stop 46 is engaged with frame member 28. At that point, the snowmobile is secured and trailer 10 is ready for transport. In FIG. 2, stop 46 is shown engaged with the center section of U-shaped frame member 28. To unclamp hold down assembly 12, handle 44 is rotated in the opposite direction to allow stop 46 and lower block 40 to be moved away from each other. After sufficient clearance is provided, post 36 can be rotated 90° or otherwise moved again to clear stop 46 from frame member 28. Post 36 can be pulled vertically upwardly out of passage 26, thereby freeing hold down assembly 12 from trailer 10.

Bar 14 is similar to a conventional ski bar known in the art. Conventional bars can be modified for use with clamp assembly 16, if desired. Hole 74 of bar 14 of FIG. 2 is sized sufficiently for slideable and rotatable receipt of post 36, and includes a separate bracket 82 riveted or otherwise attached to bar 14. The various components of clamp assembly 16 are preferably made from a durable material, such as metal. Upper and lower blocks 40, 42 can be cast or machined to have the configurations shown or other desired configurations.

Further, it is to be understood that even though numerous characteristics and advantages of the invention have been set forth in the foregoing description, together with details of the structure and function of the invention, the disclosure is illustrative only and changes may be made in detail, and especially in the matters of shape, size and arrangement of parts, wherein the principles of the invention to the full extent indicated by the broad general meaning of the terms in which the appended claims are expressed.

What is claimed is:

1. A hold down assembly for use on a snowmobile trailer comprising:
   a post having an upper end, and a lower end;
   a stop positioned at the lower end of the post;
   a releasable clamp positioned at the upper end of the post, wherein the clamp includes:
      an upper block mounted to the upper end of the post, the upper block including a threaded passage;
      a lower block slideably mounted to the post between the upper block and the stop, the lower block having a lower surface, the lower surface spaced from the stop; and
      a threaded adjustment rod received by the threaded passage of the upper block, the adjustment rod having an upper end including a handle, and a lower end mounted to the lower block, wherein rotation of the rod by the handle moves the lower block along the post; and
   a ski bar having first and second ends, and a center portion defining a hole therethrough, the post slideably and rotatably mounted in the hole of the ski bar, wherein the ski bar is positioned between the stop and the clamp, and wherein the ski bar and the stop are spaced apart to receive a portion of the trailer.

2. The assembly of claim 1, further comprising means for selectively preventing rotation of the post relative to the ski bar.

3. The assembly of claim 2, wherein the means for selectively preventing rotation includes an upwardly facing U-shaped bracket mounted to the ski bar.

4. The assembly of claim 2, wherein the means for selectively preventing rotation includes the lower surface of the lower block having an inverted channel shape.

5. The assembly of claim 1, wherein the post includes a first hole at the lower end, and wherein the stop includes a pin positioned in the hole of the post.

6. The assembly of claim 5, wherein the post includes a second hole at the lower end for selective receipt of the pin.

7. The assembly of claim 6, wherein the post includes a third hole at the lower end for selective receipt of the pin.

8. The assembly of claim 6, wherein the pin is a first pin positioned in the first hole of the post, and wherein a second pin is positioned in the second hole.

9. The assembly of claim 1, wherein the rod has a reduced diameter portion, and wherein the lower block defines a recess for receiving the reduced diameter portion of the rod, the lower block including a lock member sized to engage the reduced diameter portion.

10. The assembly of claim 9, wherein the lock member includes a pin.

11. The assembly of claim 1, further comprising a trailer having a platform with an upper surface and a lower surface, and a frame member below the platform, the platform defining a slot through the platform, the stop positioned below the lower surface of the platform and engaged with the frame member, the post positioned to extend through the slot, wherein the ski bar, the upper block, the lower block, and the rod are positioned above the upper surface of the platform and wherein the rod is rotatable to selectively mount the ski bar to the platform.

12. The assembly of claim 1, wherein the post includes a hole at the upper end, and wherein the post is mounted to the upper block with a pin mounted in the hole of the post.

13. The assembly of claim 1, wherein the stop is a first stop, and further comprising a second stop positioned at the lower end of the post and spaced from the first stop.

14. A hold down assembly for use on a snowmobile trailer comprising:
   a post having an upper end, and a lower end;
   a first stop positioned at the lower end of the post, a second stop positioned at the lower end of the post and spaced from the first stop;
   a releasable clamp positioned at the upper end of the post; and
   a ski bar having first and second ends, and a center portion defining a hole therethrough, the post slideably and rotatably mounted in the hole of the ski bar, wherein the ski bar is positioned between the first and second stops and the clamp, and wherein the ski bar and the first and second stops are spaced apart to receive a portion of the trailer.

15. A clamp assembly for mounting a ski bar to a snowmobile trailer comprising:
   a post having an upper end, and a lower end, the lower end defining a hole, a pin positioned in the hole and extending from the post;
   an upper block mounted to the upper end of the post, the upper block including a threaded passage;
   a lower block slideably mounted to the post between the upper block and the pin, the lower block having a lower surface, the lower surface spaced from the pin; and
   a threaded adjustment rod received by the threaded passage of the upper block, the adjustment rod having an upper end including a handle, and a lower end mounted to the lower block, wherein rotation of the rod by the handle moves the lower block along the post, and wherein the lower surface of the block and the pin are spaced apart to receive a portion of the trailer and a portion of the ski bar.

16. The assembly of claim 15, further comprising a ski bar slideably and rotatably mounted to the post, and means for selectively preventing rotation of the post relative to the ski bar.

17. The assembly of claim 15, wherein the pin extends in two directions from the post.

18. A snowmobile trailer comprising:

a trailer body with an upper surface and a lower surface and a passage therebetween;

a ski bar positioned above the upper surface of the trailer body; and a clamp assembly mounted to the ski bar, the clamp assembly having a portion positioned in the passage through the trailer body, the clamp assembly further including a stop at a lower end engaged with the lower surface of the trailer body, the clamp assembly further including a releasable clamp at an upper end engaged with a top of the ski bar, wherein the clamp includes:

an upper block mounted to the upper end of the post, the upper block including a threaded passage;

a lower block slideably mounted to the post between the upper block and the stop, the lower block having a lower surface, the lower surface spaced from the stop; and a threaded adjustment rod received by the threaded passage of the upper block, the adjustment rod having an upper end including a handle, and a lower end mounted to the lower block, wherein rotation of the rod by the handle moves the lower block along the post.

19. The trailer of claim 18, further comprising a snowmobile having two skis, the two skis positioned between the upper surface of the trailer body the ski bar.

20. The trailer of claim 18, wherein the passage is an elongated slot.

21. A method of mounting a ski bar to a snowmobile trailer comprising the steps of:

inserting a post of a hold down assembly into a slot in the trailer;

rotating the post of the hold down assembly 90° about a longitudinal axis of the post wherein a stop on the post is engageable with a lower surface of the trailer; and moving a clamp of the hold down assembly relative to the post to clamp the ski bar to the trailer.

22. The method of claim 21, further comprising the step of positioning two skis of a snowmobile between the ski bar and a platform before clamping the ski bar to the trailer.

23. A hold down assembly for use on a snowmobile trailer comprising:

a post having an upper end, and a lower end;

a stop positioned at the lower end of the post;

a releasable clamp positioned at the upper end of the post;

a ski bar having first and second ends, and a center portion defining a hole therethrough, the post slideably and rotatably mounted in the hole of the ski bar, wherein the ski bar is positioned between the stop and the clamp, and wherein the ski bar and the stop are spaced apart to receive a portion of the trailer; and means for selectively preventing rotation of the post relative to the ski bar, wherein the means for selectively preventing rotation includes a lower surface of the clamp having an inverted channel shape.

24. A hold down assembly for use on a snowmobile trailer comprising:

a post having an upper end, and a lower end;

a stop positioned at the lower end of the post, wherein the post includes a first hole at the lower end, and wherein the stop includes a pin positioned in the hole of the post;

a releasable clamp positioned at the upper end of the post; and a ski bar having first and second ends, and a center portion defining a hole therethrough, the post slideably and rotatably mounted in the hole of the ski bar, wherein the ski bar is positioned between the stop and the clamp, and wherein the ski bar and the stop are spaced apart to receive a portion of the trailer.

25. The assembly of claim 24, wherein the post includes a second hole at the lower end for selective receipt of the pin.

26. The assembly of claim 25, wherein the post includes a third hole at the lower end for selective receipt of the pin.

27. The assembly of claim 25, wherein the pin is a first pin positioned in the first hole of the post, and wherein a second pin is positioned in the sec hole.

* * * * *

UNITED STATES PATENT AND TRADEMARK OFFICE
CERTIFICATE OF CORRECTION

PATENT NO. : 5,716,175

DATED : February 10, 1998

INVENTOR(S) : Fenske et al.

It is certified that error appears in the above-identified patent and that said Letters Patent is hereby corrected as shown below:

In column 4, line 23, insert —14.— after the word "bar".

In claim 27, column 8, line 40, "sec" should read —second—.

Signed and Sealed this

Twentieth Day of October, 1998

*Attest:*

BRUCE LEHMAN

*Attesting Officer*   Commissioner of Patents and Trademarks